(12) United States Patent
Shinkar et al.

(10) Patent No.: US 10,955,259 B2
(45) Date of Patent: Mar. 23, 2021

(54) NAVIGATION SYSTEM WITH ENHANCED NAVIGATION DISPLAY MECHANISM AND METHOD OF OPERATION THEREOF

(71) Applicant: Telenav, Inc., Santa Clara, CA (US)

(72) Inventors: Manuj Shinkar, Sunnyvale, CA (US); Kok Wei Koh, Mountain View, CA (US); Alexander G. Glebov, San Jose, CA (US); Gregory Stewart Aist, Santa Clara, CA (US); HaiPing Jin, Saratoga, CA (US); Sarvesh Bansilal Devi, Milpitas, CA (US); Shalu Grover, Sunnyvale, CA (US); Jinghai Ren, Milpitas, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 277 days.

(21) Appl. No.: 15/789,762

(22) Filed: Oct. 20, 2017

(65) Prior Publication Data
US 2019/0120647 A1 Apr. 25, 2019

(51) Int. Cl.
*G01C 21/36* (2006.01)

(52) U.S. Cl.
CPC ....... *G01C 21/367* (2013.01); *G01C 21/3658* (2013.01); *G01C 21/3691* (2013.01)

(58) Field of Classification Search
CPC .............. G01C 21/367; G01C 21/3691; G01C 21/3658
See application file for complete search history.

(56) References Cited

U.S. PATENT DOCUMENTS

| 5,515,448 | A | 5/1996 | Nishitani | |
|---|---|---|---|---|
| 6,734,787 | B2 * | 5/2004 | Ikeda | G08G 1/167 701/117 |
| 7,215,254 | B2 * | 5/2007 | Tauchi | G08G 1/161 701/301 |
| 8,169,339 | B2 * | 5/2012 | Kawai et al. | G08G 1/164 340/905 |
| 8,346,426 | B1 * | 1/2013 | Szybalski et al. | G01C 21/367 701/28 |

(Continued)

FOREIGN PATENT DOCUMENTS

WO WO2017164837 A1 * 9/2017 ....... G08G 1/096725

*Primary Examiner* — Dale W Hilgendorf
(74) *Attorney, Agent, or Firm* — Perspectives Law Group, Corp.

(57) ABSTRACT

A navigation system includes: a communication unit configured to receive vehicle environment information of a user vehicle for identifying a proximately located vehicle relative to the user vehicle during operation of the user vehicle; a control unit, coupled to the communication unit, configured to: determine proximate vehicle information of the proximately located vehicle, including a relative location and a relative distance from the user vehicle, from the vehicle environment information; and generate a navigation interface including a proximate vehicle representation of the proximately located vehicle and a user vehicle representation of the user vehicle on an interface map based on the relative location and the relative distance of the proximately located vehicle, wherein the proximate vehicle representation and the user vehicle representation are presented based on an interface scaled distance for displaying on a device.

20 Claims, 5 Drawing Sheets

(56) References Cited

U.S. PATENT DOCUMENTS

| | | | |
|---|---|---|---|
| 8,352,112 B2 * | 1/2013 | Mudalige | G08G 1/164 701/117 |
| 8,520,695 B1 * | 8/2013 | Rubin et al. | G01C 21/3658 370/445 |
| 8,676,431 B1 * | 3/2014 | Mariet et al. | G01C 21/367 701/301 |
| 9,021,384 B1 | 4/2015 | Beard et al. | |
| 10,347,127 B2 * | 7/2019 | Droz et al. | G08G 1/166 |
| 10,698,404 B2 * | 6/2020 | Nelson | G05D 1/0276 |
| 2001/0040505 A1 * | 11/2001 | Ishida et al. | G01C 21/3697 701/436 |
| 2002/0169548 A1 * | 11/2002 | Kuroda et al. | G01C 21/367 701/455 |
| 2005/0216191 A1 * | 9/2005 | Sumizawa et al. | G01C 21/367 701/442 |
| 2010/0020169 A1 * | 1/2010 | Jang et al. | G01C 21/36 701/532 |
| 2010/0030169 A1 * | 1/2010 | Jang et al. | G01C 21/36 701/532 |
| 2012/0143489 A1 * | 6/2012 | Lee et al. | G01C 21/3658 701/400 |
| 2013/0082874 A1 * | 4/2013 | Zhang | G08G 1/167 340/936 |
| 2014/0236414 A1 * | 8/2014 | Droz et al. | G08G 1/166 701/28 |
| 2014/0365944 A1 * | 12/2014 | Moore et al. | G01C 21/367 715/772 |
| 2016/0306357 A1 * | 10/2016 | Wieskamp et al. | G08G 1/162 |
| 2016/0349066 A1 * | 12/2016 | Chung et al. | G01C 21/3605 |
| 2019/0088126 A1 * | 3/2019 | Banvait et al. | G08G 1/096791 |

\* cited by examiner

NAVIGATION SYSTEM WITH ENHANCED NAVIGATION DISPLAY MECHANISM AND METHOD OF OPERATION THEREOF

TECHNICAL FIELD

An embodiment of the present invention relates generally to a navigation system, and more particularly to a system for enhanced navigation display.

BACKGROUND

Modern consumer and industrial electronics, especially devices such as graphical navigation systems, cellular phones, and vehicle integrated navigation and computing systems, are providing increasing levels of functionality to support modern life, including navigation and route guidance services. Research and development in the existing technologies can take a myriad of different directions.

As users become more empowered with the growth of navigation devices and vehicle based navigation services, new and old paradigms begin to take advantage of this new device space. There are many technological solutions to take advantage of this new device capability to enhance or augment navigation and route guidance. However, users are often not provided with significant information regarding their surroundings while using the devices.

Thus, a need still remains for a navigation system with an enhanced navigation display mechanism for operator awareness while using a navigation system. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a communication unit configured to receive vehicle environmental information of a user vehicle for identifying a proximately located vehicle relative to the user vehicle during operation of the user vehicle; a control unit, coupled to the communication unit, configured to: determine proximate vehicle information of the proximately located vehicle, including a relative location and a relative distance from the user vehicle, from the vehicle environmental information; and generate a navigation interface including a proximate vehicle representation of the proximately located vehicle and a user vehicle representation of the user vehicle on an interface map based on the relative position and the relative distance of the proximately located vehicle, wherein the proximate vehicle representation and the user vehicle representation are presented based on an interface scaled distance for displaying on a device.

An embodiment of the present invention provides a method of operation of a navigation system including: receiving vehicle environmental information of a user vehicle for identifying a proximately located vehicle relative to a user vehicle during operation of the user vehicle; determining proximate vehicle information of the proximately located vehicle, including a relative location and a relative distance from the user vehicle, from the vehicle environmental information; and generating a navigation interface including a proximate vehicle representation of the proximately located vehicle and a user vehicle representation of the user vehicle on an interface map based on the relative position and the relative distance of the proximately located vehicle, wherein the proximate vehicle representation and the user vehicle representation are presented based on an interface scaled distance for displaying on a device.

An embodiment of the present invention provides a non-transitory computer readable medium including instructions executable by a control circuit for a navigation system, the instructions including: receiving vehicle environmental information of a user vehicle for identifying a proximately located vehicle relative to a user vehicle during operation of the user vehicle; determining proximate vehicle information of the proximately located vehicle, including a relative location and a relative distance from the user vehicle, from the vehicle environmental information; and generating a navigation interface including a proximate vehicle representation of the proximately located vehicle and a user vehicle representation of the user vehicle on an interface map based on the relative position and the relative distance of the proximately located vehicle, wherein the proximate vehicle representation and the user vehicle representation are presented based on an interface scaled distance for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
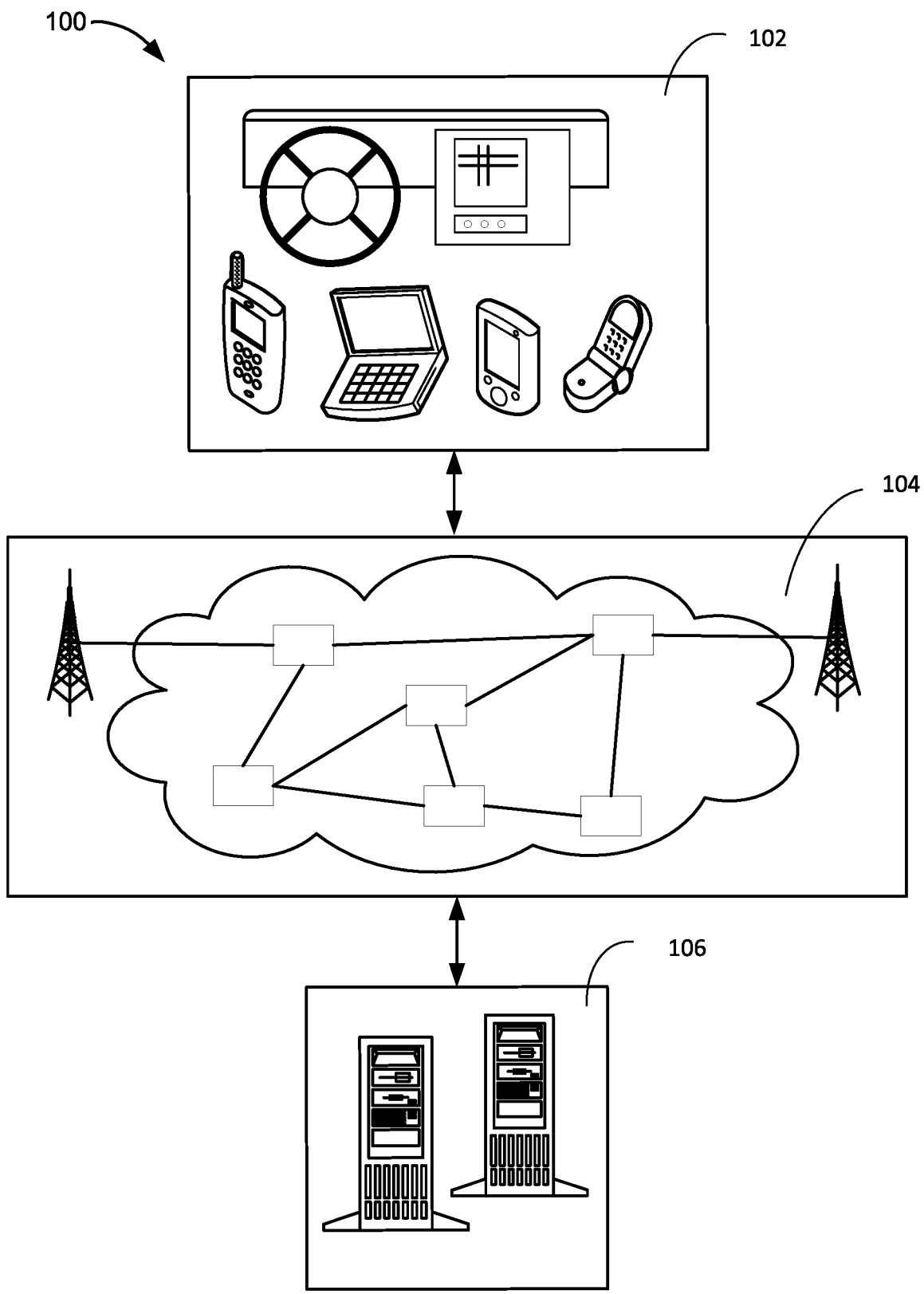
FIG. 1 is a navigation system with enhanced navigation display mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with enhanced navigation display mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices, such as a standalone sensor or measurement device. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, BLUETOOTH™ Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
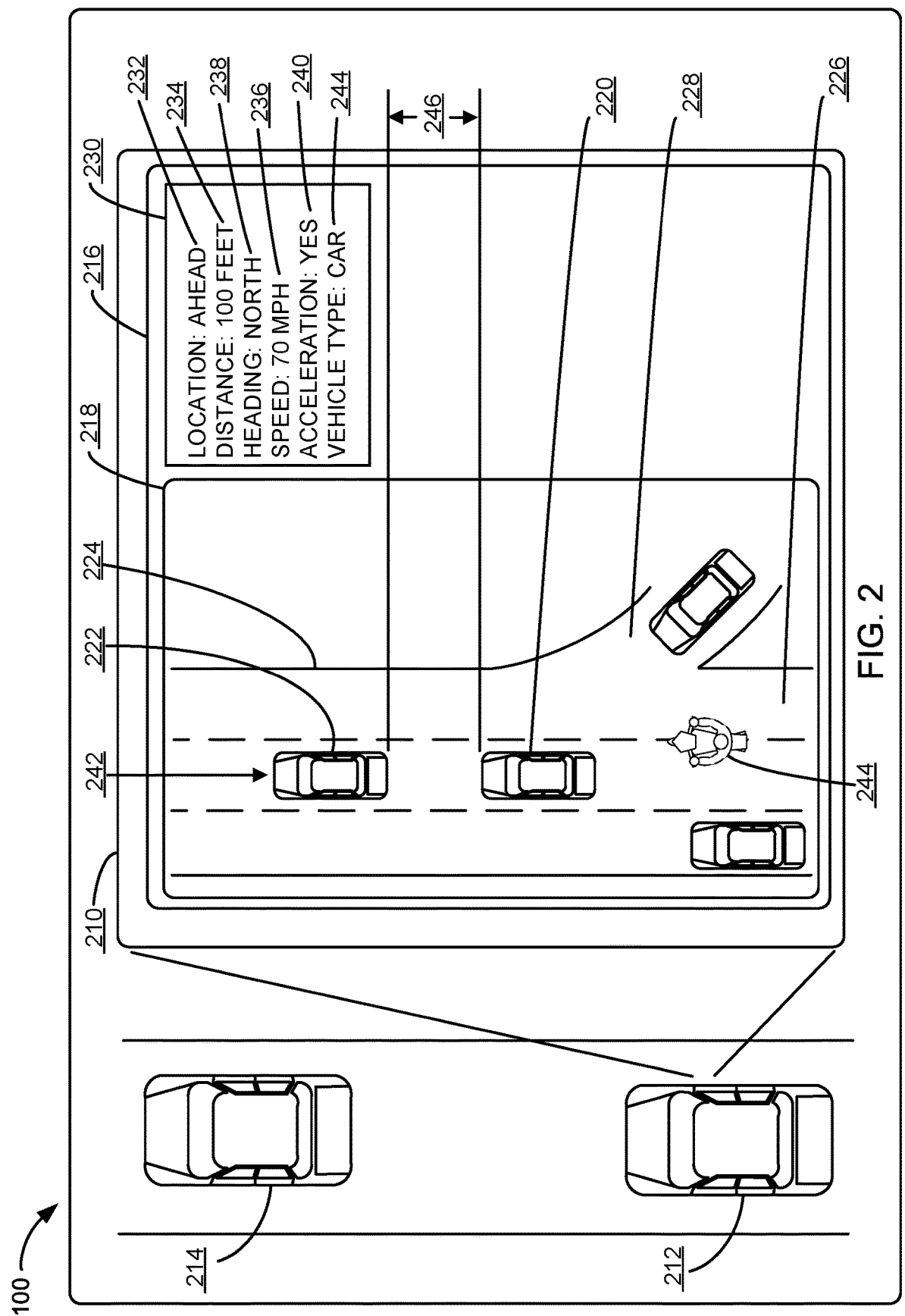
FIG. 2 is an example of a display interface of the first device of FIG. 1.

Referring now to FIG. 2, therein is shown an example of a display interface 210 of the first device 102 of FIG. 1. The display interface 210 can be part of an attached or embedded vehicle interface of a user vehicle 212, such as a dashboard or center console integrated display, a mobile or standalone device, such as a navigation device, mobile phone, or mobile computing device. The user vehicle 212 can be a vehicle occupied by the user (not shown) of the first device 102, such as the operator or driver of the user vehicle 212.

The display interface 210 can present a navigation interface 216. The navigation interface 216 is an interface for presenting geographic information. For example, the navigation interface 216 can present information about travel or navigation while in or operating the user vehicle 212. More specifically, the navigation interface 216 can be a graphical representation of the various aspects of environment around the user vehicle 212, such as geographic information, road infrastructure information, or a proximately located vehicle 214 relative to the user vehicle 212.

The proximately located vehicle 214 is a vehicle within proximity to the user vehicle 212. For example, the proximately located vehicle 214 can be a vehicle that is within a specific range or distance of the user vehicle 212 or a relative distance from the user vehicle 212. An example of the specific range can be a predetermined value, such as within 100 or 1,000 feet, or a distance determined by the user or manufacture of the user vehicle 212. An example of the relative range can be the closest vehicle to the user vehicle 212, such as a vehicle in front of, lateral to, or behind the use vehicle 212.

In one implementation, the navigation interface 216 can depict an interface map 218, a user vehicle representation 220 of the user vehicle 212, a proximate vehicle representation 222 of one or more instances of the proximately located vehicle 214, or a combination thereof. The user vehicle representation 220 is a graphical representation of the user vehicle 212. The proximate vehicle representation 222 is a graphical representation of the proximately located vehicle 214.

The interface map 218 is a graphical representation of a geographical area. For example, the interface map 218 can depict the geographic area surrounding the user vehicle 212. In another example, the interface map 218 can be a depiction of a specified geographic area or location that does not include the user vehicle 212, such as a destination the user desires to travel to or another location presented by the navigation system 100 or selected by the user.

For illustrative purposes, the navigation interface 216 is depicted showing multiple instances of the proximate vehicle representation 222 with the user vehicle representation 220, although it is understood that the navigation interface 216 can be presented differently. For example, the navigation interface 216 can depict a single or specific instance of the proximate vehicle representation 222, such as the proximate vehicle representation 222 corresponding to the proximately located vehicle 214 adjacent to the user vehicle 212. In another example, the navigation interface 216 can be depicted with or without the user vehicle representation 220.

The interface map 218 can include a travel path 224, which is a path on which the user vehicle 212 is currently located. For example, the travel path 224 can be a road, highway, unpaved path, or a parking lot.

The interface map 218 can depict details or features of the travel path 224 including, but not limited to, the number of instances of a travel lane 226; a lane merge section 228; on and off ramps; intersections with other instances or types of the travel path 224; vehicle restrictions, such as bike lanes, toll lanes, or high occupancy vehicle lanes; road surface conditions, such as paved or unpaved surfaces; or a combination thereof. The lane merge section 228 are sections of the travel path 224 where two or more instances of the travel lane 226 merge into a single instance of the travel lane 226.

The travel lane 226 can be graphical representations of individual lanes on a road or highway. The navigation interface 216 can depict the interface map 218 to include the number of instances of the travel lane 226 matching or corresponding to the actual number of instances of the travel lane 226 along a section of the travel path 224. For example, a highway with three lanes of can be depicted on the interface map 218 with the travel path 224 having three instances of the travel lane 226.

The navigation interface 216 can present proximate vehicle information 230 for one or more instances of the proximately located vehicle 214. The proximate vehicle information 230 can be information about the proximately located vehicle 214 including, but is not limited to: a relative location 232, which is the position of the proximately located vehicle 214 relative to the user vehicle 212; a relative distance 234, which is the distance between the proximately located vehicle 214 and the user vehicle 212; a vehicle speed 236 of the proximately located vehicle 214; a vehicle heading 238 of the proximately located vehicle 214, such as the cardinal direction the proximately located vehicle 214 is traveling; an acceleration indicator 240, which is an indication of whether the proximately located vehicle 214 is in a state of acceleration or deceleration; a lane position 242 of the proximately located vehicle 214; a vehicle type 244 of the proximately located vehicle 214, or a combination thereof. Each instance of the proximate vehicle information 230 can be an approximation or estimate representing each of the respective actual values or information.

The relative distance 234 between the proximate vehicle representation 222 and the user vehicle representation 220 can be represented as an interface scaled distance 246. The interface scaled distance 246 is a proportional representation of the relative distance 234 between the user vehicle 212 and the proximately located vehicle 214. For example, the interface scaled distance 246 can be a distance scaled based on the dimensions of the navigation interface. Details of the interface scaled distance 246 will be discussed below.

One or more instances of the proximate vehicle representation 222 can be presented on the interface map 218 based on the relative location 232, the lane position 242, or a combination thereof of the proximately located vehicle 214. For example, the proximately located vehicle 214 with the relative location 232 as ahead of or behind the user vehicle 212 and with the lane position 242 as the same lane as the user vehicle 212 can be depicted on the navigation interface 216 with the proximate vehicle representation 222 ahead of or behind the user vehicle representation 220 having the same instance of the lane position 242. Similarly, for example, the proximately located vehicle 214 with the relative location 232 lateral to the user vehicle 212 and in an adjacent instance of the travel lane 226 can be depicted on the navigation interface 216 with the proximate vehicle representation 222 in an adjacent instance of the travel lane 226 and lateral to the user vehicle representation 220.

The navigation interface 216 can depict real time traffic information based on the proximate vehicle information 230. For example, the navigation interface 216 can depict multiple instances of the proximate vehicle representation 222 to represent speed or traffic flow, the number of cars in a given instance of the travel lane 226, an average lane speed for an instance of the travel lane 226 or a combination thereof.

In one implementation, the navigation interface 216 can present the proximate vehicle representation 222 based on the vehicle type 244 of the proximately located vehicle 214. The vehicle type 244 is a general category or classification of a vehicle. For example, the vehicle type 244 can be general category of vehicle such as, but not limited to, a bicycle, a motorized scooter, a motorcycle, a car, truck, a sport utility vehicle, a van, a bus, a recreational camper vehicle, a tractor trailer, or a construction vehicle. For illustrative purposes, the vehicle type 244 for the proximate vehicle representation 222 is depicted with the vehicle type 244 as a car or a motorcycle. However, it is understood that the proximate vehicle representation 244 can be depicted to correspond to the vehicle type 244 of the proximately located vehicle 214.

As a specific example, the navigation interface 216 can depict the proximate vehicle representation 222 with the vehicle type 244 as a motorcycle traveling in a lane splitting or lane straddling movement or motion pattern based on the relative location 232, the relative distance 234, lane position 242, or a combination thereof for the motorcycle. More specifically, the lane splitting or lane straddling movement or motion pattern can be depicted by the proximate vehicle representation 222 of the motorcycle traveling along an edge of, between, or a combination thereof of the instances of the travel lane 226.

In a further example, the navigation interface 216 can depict the proximate vehicle representation 222 as a grouping for multiple instances of the proximately located vehicle 214 or other groups of objects to simplify or reduce the complexity of the navigation interface 216. In a specific example, in the situation where a group of the proximately located vehicle 214 includes a group of motorcycles or bicycles, the navigation interface 216 can present the proximate vehicle representation 222 as a single motorcycle with a numeral superimposed over the proximate vehicle representation 222 representing the actual number of the proximately located vehicle 214. In another specific example, in the situation of the user vehicle 212 entering a parking lot, the navigation interface 216 can abbreviate the proximate vehicle representation 222 corresponding to a full row of parked instances of the proximately located vehicle 214 by presenting an instance of the proximate vehicle representation 222 at one end of the parking lot and another instance of the proximate vehicle representation 222 at the other end of the parking lot with a series of dots or dashes in between to signify that the row of parking spaces are occupied.

For illustrative purposes, the navigation interface 216 is depicted with the interface map 218 in a top down or bird's eye view of the proximate vehicle representation 222 and user vehicle representation 220. However, it is understood that the navigation interface 216 can be depicted at a different angle or perspective. For example, the navigation interface 216 can depict the user vehicle representation 220 from a perspective behind the user vehicle representation 220.

Figure 3:
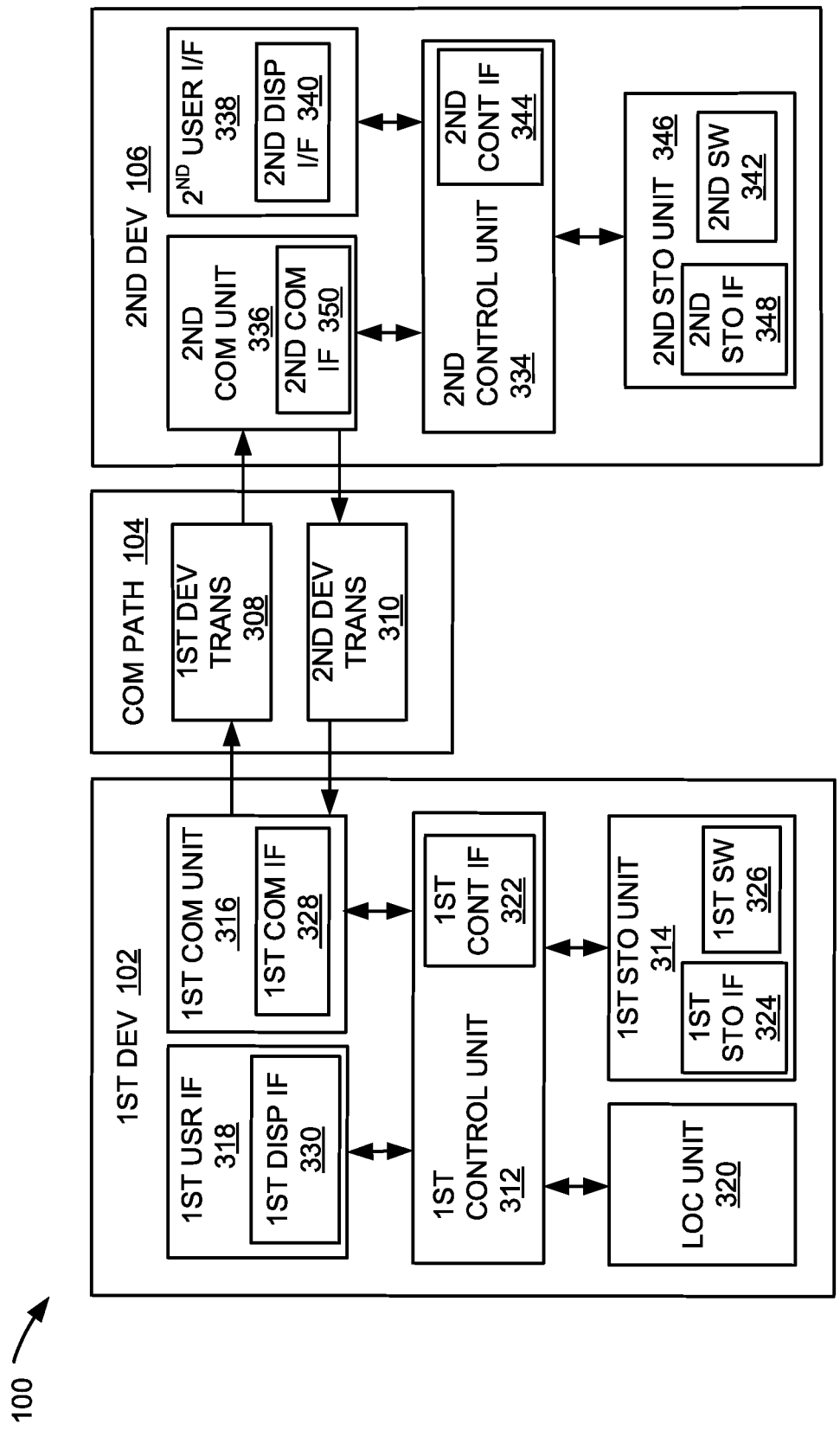
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information. For example, first storage unit 314 information for generating the interface map 218 of FIG. 2

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information for generating the interface map 218 of FIG. 2. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
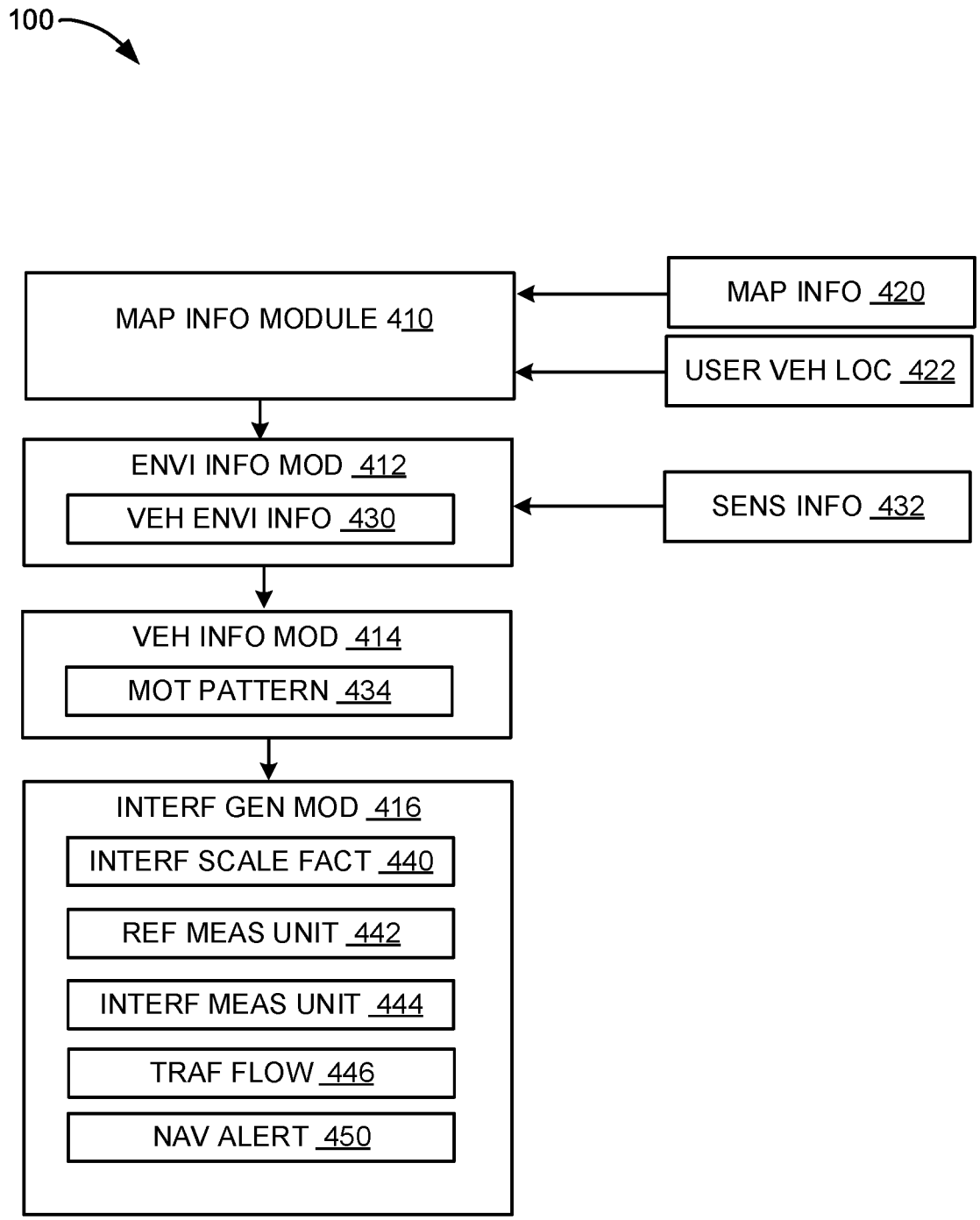
FIG. 4 is a control flow of the navigation system.

Referring now to FIG. 4, therein is shown a control flow of the navigation system 100. The navigation system 100 can include a map information module 410, an environment information module 412, a vehicle information module 414, and an interface generation module 416. The environment information module 412 can be coupled to the map information module 410. The vehicle information module 414 can be coupled to the environment information module 412. The interface generation module 416 can be coupled to the vehicle information module 414.

The map information module 410 is for processing information to generating a map. More specifically, the map information module 410 can process map information 420 for generating the interface map 218 of FIG. 2 of the navigation interface 216 of FIG. 2.

The map information 420 is information representing a geographic area. For example, the map information 420 can include, but is not limited to, information about travel infrastructure, such as roads and highways; specific location information, such as building addresses; geographic features, such as terrain, bodies of water, and topography; or a combination thereof. As a specific example, the map information 420 can include the number of the travel lane 226 of FIG. 2 for a particular instance of the travel path 224 of FIG. 2. In another specific example, the map information 420 can include merge section information, including the location and length of the lane merge section 228 of FIG. 2.

The map information module 410 can process the map information 420 in a number of ways. For example, the map information module 410 can determine the map information 420 for presenting on the navigation interface 216 of FIG. 2 by requesting, retrieving, or receiving the map information 420, or a combination thereof. As a specific example, the map information module 410 can utilize a user vehicle location 422, which is the geographic or physical location of the user vehicle 212, to determine the map information 420. More specifically, the map information module 410 can interface with the location unit 320 of FIG. 3 of the first device 102 to determine the user vehicle location 422, such as the GPS coordinates or the longitude and latitude of the user vehicle 212. To continue the example, the map information module 410 can utilize the user vehicle location 422 to get the map information 420 for the geographic area around the user vehicle 212. In general, the navigation system 100 can receive the map information 420 centered on the user vehicle 212, however it is understood that the map information 420 can include information about geographic areas that do not include the user vehicle 212. For example, the map information 420 can be information about a specified geographic location, such as a potential destination.

In another example, the map information module 410 can process the map information 420 based on the state of the map information 420. As a specific example, the map information 420 can be raw or unprocessed geographic data or information, or processed geographic data or information, such as pre-generated or pre-rendered maps or images representing the geographic data or information. In the case of raw or unprocessed information, the map information module 410 can render the interface map 218 from the map information 420. In the case of the processed information, the map information module 410 can alter or modify the map information 420, such as resizing, cropping, adding or removing information, or a combination thereof for presenting on the navigation interface 216.

The map information module 410 can receive the map information 420 from various sources. For example, the map information module 410 can receive the map information 420 stored in the first control unit 312 of FIG. 3 of the first device 102. In another example, the map information module 410 can receive the map information 420 from a device other than the first device 102, such as an external storage unit or server, the second storage unit 314 of FIG. 3, or a combination thereof.

The environment information module 412 is for collecting information about the environment around the user vehicle 212. More specifically, the environment information module 412 can collect vehicle environment information 430, which is information regarding objects surrounding the user vehicle 212. For example, the vehicle environment information 430 can include information about stationary objects, such as road fixtures, signs, trees, or buildings, or moving objects, such as vehicles, animals, or people. In another example, the vehicle environment information 430 can include, but are not limited to, GPS data, radar data, LIDAR data, infrared data, image captured data, audio signals, or a combination thereof.

The environment information module 412 can collect the vehicle environment information 430 in a number of ways. In one implementation, the vehicle environment information 430 can be information received through communication or interfacing with other vehicles; information accumulated from sensors or detection instruments; information received from other sources external to the user vehicle 212 or the first device 102, such as a computer server or network; or a combination thereof. More specifically, the first control unit 312 can implement the first communication unit 316 with the environment information module 412 to communicate with devices external to the first device 102, such a communication unit of surrounding vehicles or a traffic server.

In another implementation, the environment information module 412 can collect the vehicle environment information 430 as sensor information 432. For example, the environment information module 412 can collect the vehicle environment information 430 by sending commands or requests to a sensor unit to take various readings, which can be transmitted back to the environment information module 412 as the sensor information 432.

The sensor unit can be a device that includes sensors and detection instruments. For example, the sensor unit can include one or more instruments or sensors, such as a camera, a microphone, an infrared detector, a radar detector, a LIDAR unit, or a combination thereof. The sensor unit can include instruments and sensors attached to or integrated with the user vehicle 212 or external to the user vehicle 212, such as sensors or instruments mounted on the side of the road. In an implementation, the sensor unit can be a part of or coupled to the first device 102, the second device 106, or a combination thereof.

The sensor information 432 can be information recorded or measured by sensors or instruments, such as the sensor unit, about the area or environment surrounding the user vehicle 212. The vehicle environment information 430 including the sensor information 432 can include various types of information regarding objects surrounding the user vehicle 212 and can be provided in a number of different formats and states. The format of the vehicle environment information 430 can be based on the source of the vehicle environment information 430. For example, the state of the vehicle environment information 430 can be raw or unprocessed information, such as raw signals or images, partially processed information, or processed information. More specifically, the sensor information 432 can be raw or unprocessed information or partially processed information sensor readings measured or recorded by the sensor unit.

Collecting the vehicle environment information 430 with the environment information module 412 has been described as separate implementations for illustrative purposes. However, it is understood that the environment information module 412 can use a combination of the implementations to gather the vehicle environment information 430, which can include the sensor information 432.

The control flow can pass to the vehicle information module 414. The vehicle information module 414 is for determining the proximate vehicle information 230 for the proximately located vehicle 214. More specifically, the vehicle information module 414 can determine the proximate vehicle information 230 from the vehicle environment information 430.

The vehicle information module 414 can determine the proximate vehicle information 230 in a number of ways. For example, based on available types and the state of the vehicle environment information 430, the vehicle information module 414 can determine the proximate vehicle information 230 by calculation, extraction, or a combination thereof.

In one implementation, the vehicle information module 414 can identify the proximate vehicle information 230 of the proximately located vehicle 214 from the vehicle environment information 430. For example, In the case of the processed instances of the vehicle environment information 430, the vehicle information module 414 can determine the proximate vehicle information 230 by extraction from the vehicle environment information 430. More specifically, the vehicle information module 414 can extract the proximate vehicle information 230 from the vehicle information module 414 when the vehicle environmental information 430 has been processed to include one or more of the proximate vehicle information 230.

In the case of the raw, unprocessed, or partially processed instances of the vehicle environment information 430, the vehicle information module 414 can calculate the proximate vehicle information 230 from the vehicle environment information 430 for one or more instances of the proximately located vehicle 214. For example, the vehicle information module 414 can identify patterns in the vehicle environment information 430 that are recognized as a vehicle, such as heat signatures, movement, location, shape, or any combination thereof. As another example, the vehicle information module 414 can compare or corroborate information between different types or sources of the vehicle environment information 430.

In a further example, the vehicle information module 414 can calculate the relative distance 234 of FIG. 2, the vehicle speed 236 of FIG. 2, the acceleration indicator 240 of FIG. 2, or a combination thereof based on the vehicle environment information 430. As a specific example, the vehicle information module 414 can calculate the vehicle speed 236 and the acceleration indicator 240 based on changes and the rate of changes in the relative location 232, the relative distance 234, or a combination thereof over a specific period of time. In yet a further example, the vehicle information module 414 can determine the lane position 242 of the proximately located vehicle 214 based on the relative location 232 and the map information 420. As a specific example, the vehicle information module 414 can correlate or overlay the map information 420 with the relative location 232 of the proximately located vehicle 214 to determine the instance of the travel lane 226 for the proximately located vehicle 214 relative to the user vehicle 212.

In a further example, the vehicle information module 414 can calculate the relative distance 234 of FIG. 2, the vehicle speed 236 of FIG. 2, the acceleration indicator 240 of FIG. 2, or a combination thereof based on the vehicle environment information 430. As a specific example, the vehicle information module 414 can calculate the vehicle speed 236 and the acceleration indicator 240 based on changes and the rate of changes in the relative location 232, the relative distance 234, or a combination thereof over a specific period of time. In yet a further example, the vehicle information module 414 can determine the lane position 242 of the proximately located vehicle 214 based on the relative location 232 and the map information 420. As a specific example, the vehicle information module 414 can correlate or overlay the map information 420 with the relative location 232 of the proximately located vehicle 214 to determine the instance of the travel lane 226 for the proximately located vehicle 214 relative to the user vehicle 212.

The vehicle information module 414 can determine the motion pattern 434 of the proximately located vehicle 214 based on the proximate vehicle information 230. For example, the vehicle information module 414 can determine the motion pattern 434 based on changes in the vehicle speed 236, the acceleration indicator 240, the vehicle heading 238, the lane position 242, or a combination thereof with respect to the map information 420, or a combination thereof. As a specific example, the vehicle information module 414 can determine the motion pattern 434 as a swerving motion or maneuver when the vehicle heading 238, the lane position 242, or a combination thereof indicates that the proximately located vehicle 214 is encroaching on or moving laterally back and forth partially or fully into adjacent instances of the travel lane 226. In another specific example, the vehicle information module 414 can determine the motion pattern 434 as a collision trajectory when the vehicle heading 238, the vehicle speed 236, the relative distance 234, the relative location 232, or a combination thereof, indicates that the proximately located vehicle 214 has a risk of colliding with the user vehicle 212.

In yet a further specific example, the vehicle information module 414 can determine the motion pattern 434 as the lane splitting maneuver based on the relative location 232, the relative distance 234, lane position 242, or a combination thereof for the vehicle type 244 as a motorcycle. More specifically, the motion pattern 434 can be determined as the lane splitting maneuver when the lane position 242 indicates that the proximately located vehicle 214 is traveling continuously between other instances of the proximately located vehicle 214 that are traveling within the respective instances of the travel lane 226 and when the vehicle speed 236 of the proximately located vehicle 214 is at a rate that is greater relative to the vehicle speed 236 of the proximately located vehicle 214 that are traveling within the respective instances of the travel lane 226.

The control flow can pass from the vehicle information module 414 to the vehicle interface generation module 416. The vehicle interface generation module 416 is for generating the navigation interface 216 of FIG. 2. The interface generation module 416 can generate the navigation interface 216 based on the proximate vehicle information 230 of the proximately located vehicle 214, the user vehicle location 422, the map information 420, the interface scaled distance 246, or a combination thereof.

The interface generation module 416 can generate graphical representation of objects, such as the interface map 218, the user vehicle representation 220, the proximate vehicle representation 222, or a combination thereof based on the interface scaled distance 246. The interface scaled distance 246 is a unit of distance or measurement for the navigation interface 216 that is proportional to an object in the real world. For example, the interface scaled distance 246 can be the representation of the relative distance 234 between the user vehicle 212 proximately located vehicle 214. The interface generation module 416 can calculate the interface scaled distance 246 based on an interface scaling factor 440.

The interface scaling factor 440 is a ratio between a reference measurement unit 442 and an interface measurement unit 444. The reference measurement unit 442 is a unit of distance based on distances between objects in the real world. For example, the reference measurement unit 442 can be a fixed or set distance or a variable distance. An example of the reference measurement unit 442 as a variable distance can include the relative distance 234 between the user vehicle 212 and the proximately located vehicle 214, since the relative distance 234 can change based on the motion of the user vehicle 212 and the proximately located vehicle 214. The reference measurement unit 442 can be based on a standard unit of measure or measurement system, such as a metric units or imperial units.

The interface measurement unit 444 is a unit of measurement used to generate the graphical representations on the navigation interface 216. For example, the interface measurement unit 444 can be based on a standard unit of measure or measurement system, such as a metric units or imperial units. In another example, the interface measurement unit 444 can be based on a number or size of pixels in the display interface 210 of FIG. 2. In general, the interface measurement unit 444 is a static value.

The interface scaling factor 440 can be a static value or a dynamic value. For example, the interface scaling factor 440 can be a static value when the reference measurement unit 442 and the interface measurement unit 444 are static values.

The interface scaling factor 440 can be a dynamic value when the reference measurement unit 442 is a dynamic value. For example, since the relative distance 234 between the user vehicle 212 and the proximately located vehicle 214 can be variable, the interface scaling factor 440 can be calculated as a dynamic value as the ratio between the interface measurement unit 444 and the reference measurement unit 442 based on the relative distance 234 of the proximately located vehicle 214.

In an implementation of the navigation system 100, the vehicle interface generation module 416 can generate the navigation interface 216 to include one or more instances of the proximate vehicle representation 222 presented on the interface map 218 based on the proximate vehicle information 230, such as the relative location 232, the lane position 242, or a combination thereof of the proximately located vehicle 214. For example, the proximately located vehicle 214 with the relative location 232 as ahead of the user vehicle 212 and with the lane position 242 as the same lane as the user vehicle 212 can be depicted on the navigation interface 216 with the proximate vehicle representation 222 ahead of the user vehicle representation 220 having the same instance of the lane position 242.

Similarly, for example, the proximately located vehicle 214 with the relative location 232 with the relative location 232 lateral to the user vehicle 212 and in an adjacent instance of the travel lane 226 can be depicted on the navigation interface 216 with the proximate vehicle representation 222 in an adjacent instance of the travel lane 226 lateral to the user vehicle representation 220. In another example, the vehicle interface generation module 416 can generate the navigation interface 216 to include the proximate vehicle representation 222 in the lane merge section 228 when the relative location 232 indicates that the proximately located vehicle 214 is in the lane merge section 228. In the above examples, the interface generation module 416 can generate the navigation interface 216 with the relative distance 234 between the proximate vehicle representation 222 and the user vehicle representation 220 represented as the interface scaled distance 246.

The interface generation module 416 can generate the navigation interface 216 to present a traffic flow 446 for one or more of the travel lane 226. The traffic flow 446 can be based on the proximate vehicle information 230 for multiple instances of the proximately located vehicle 214. The navigation interface 216 can be generated to depict real time traffic information based on the proximate vehicle information 230. For example, the navigation interface 216 can depict multiple instances of the proximate vehicle representation 222 to represent speed or traffic flow, the number of cars in a given instance of the travel lane 226, an average lane speed for an instance of the travel lane 226 or a combination thereof. In the example of the average lane speed, the interface generation module 416 can calculate the average lane speed as an average of the vehicle speed 236 of multiple instances of the proximately located vehicle 214 in a given instance of the travel lane 226.

The interface generation module 416 can generate the navigation interface 216 to present the proximate vehicle representation 222 based on the vehicle type 244 of the proximately located vehicle 214. The vehicle type 244 is a general category or classification of a vehicle. For example, the vehicle type 244 can be general category of vehicle such as, but not limited to, a bicycle, a motorized scooter, a motorcycle, a car, truck, a sport utility vehicle, a van, a bus, a recreational camper vehicle, a tractor trailer, or, a construction vehicle. As a specific example, the vehicle type 244 of the user vehicle representation 220, the proximate vehicle representation 222, or a combination thereof can be scaled based on the interface scaling factor 440.

In another specific example, the interface generation module 416 can generate the navigation interface 216 to depict the proximate vehicle representation 222 with the vehicle type 244 as a motorcycle performing the lane splitting maneuver based on the motion pattern 434. More specifically, the navigation interface 216 can depict the proximate vehicle representation 222 as the motorcycle with the lane position 242 as between two adjacent instances of the travel lane 226, along the edge of an instance of the travel lane 226 or a combination thereof.

In yet a further specific example, the interface generation module 416 can generate the navigation interface 216 to depict the proximate vehicle representation 222 as a grouping for multiple instances of the proximately located vehicle 214 or other groups of objects to simplify or reduce the complexity of the navigation interface 216. For instance, in the situation where a group of the proximately located vehicle 214 includes a group of motorcycles or bicycles, the navigation interface 216 can present the proximate vehicle representation 222 as a single motorcycle or bicyclist with a numeral superimposed over the proximate vehicle representation 222 representing the actual number of the proximately located vehicle 214. In the situation of the user vehicle 212 entering a parking lot, the navigation interface 216 can abbreviate the proximate vehicle representation 222 corresponding to a full row of parked instances of the proximately located vehicle 214 by presenting an instance of the proximate vehicle representation 222 at one end of the parking lot and another instance of the proximate vehicle representation 222 at the other end of the parking lot with a series of dots or dashes in between to signify that the row of parking spaces are occupied.

The interface generation module 416 can generate the navigation interface 216 to include a navigation alert 450. The navigation alert 450 is a warning regarding the proximately located vehicles 214. More specifically, the navigation alerts 450 can be a warning based on the motion pattern 434 of the proximately located vehicles 214. As a specific example, the navigation alert 450 can be a warning of a possible collision with one of the proximately located vehicles 214 for the motion pattern 434 of a collision trajectory. As another example, the navigation alert 450 can be a warning of an approaching instance of the proximately located vehicle 214 with the vehicle type 244 with the motion pattern 434 of the lane splitting maneuver.

The interface generation module 416 can generate the navigation alert 450 in a number of different ways. For example, the interface generation module 416 can generate the navigation alert 450 to include audio elements, visual elements, haptic elements, or a combination thereof through the first user interface 318 of FIG. 3.

The interface generation module 416 can generate the navigation interface 216 from a number of different perspective views or view angles. For example, the interface generation module 416 can generate the interface map 218 in a top down or bird's eye view of the proximate vehicle representation 222 and user vehicle representation 220. In another example, the navigation interface 216 can depict the user vehicle representation 220 from a perspective behind the user vehicle representation 220.

The navigation system 100 can presented the navigation interface 216 for display on the first device 100. For example, the navigation interface 216 can be presented on the first display interface 330 of FIG. 3, the display interface 210 of the FIG. 2, or a combination thereof.

It has been discovered that the navigation system 100 provides improved operation safety of the user vehicle 212. The navigation interface 216 can provide the proximate vehicle information 230 for the proximately located vehicle 214 for the operator or occupants of the user vehicle which increases awareness and, thereby, improves safety in operating the user vehicle 212.

The navigation system 100 has been described with module functions or order as an example. The navigation system 100 can partition the modules differently or order the modules differently. For example, the map information module 410 can be coupled to the interface generation module 416.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be hardware implementation or hardware accelerators in the first control unit 312 of FIG. 3 or in the second control unit 338 of FIG. 3. The modules can also be hardware implementation or hardware accelerators within the first device 102 or the second device 106 but outside of the first control unit 312 or the second control unit 338, respectively, as depicted in FIG. 3. However, it is understood that the first control unit 312, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer readable medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from generating the navigation interface 216 with the proximate vehicle representation 222 results in the movement in the physical world, such as maneuvering the user vehicle 212 in response to the proximate vehicle information 230. Movement in the physical world, such as maneuvering of the user vehicle 212, results in changes to the navigation interface 216 by updating the user vehicle representation 220 and the proximate vehicle representation 222.

Figure 5:
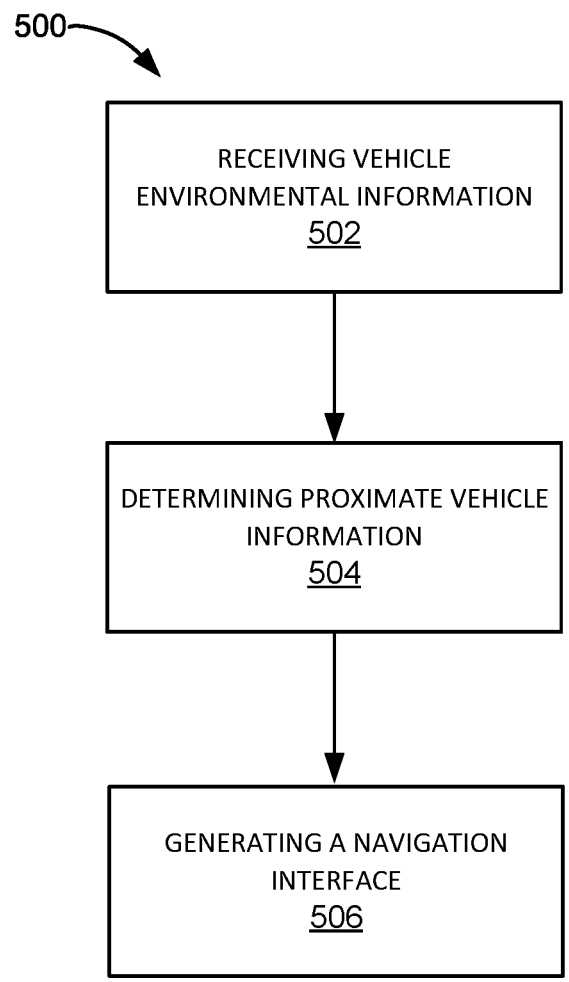
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: receiving vehicle environmental information of a user vehicle for identifying a proximately located vehicle relative to a user vehicle during operation of the user vehicle in a block 502; determining proximate vehicle information of the proximately located vehicle, including a relative location and a relative distance from the user vehicle, from the vehicle environmental information in a block 504; and generating a navigation interface including a proximate vehicle representation of the proximately located vehicle and a user vehicle representation of the user vehicle on an interface map based on the relative position and the relative distance of the proximately located vehicle, wherein the proximate vehicle representation and the user vehicle representation are presented based on an interface scaled distance for displaying on a device in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a communication unit, including microelectronics, configured to receive vehicle environment information of a user vehicle for identifying a proximately located vehicle relative to the user vehicle during operation of the user vehicle; and
   a control unit, including a processor and coupled to the communication unit, configured to:
   determine proximate vehicle information of the proximately located vehicle, including a relative location and a relative distance from the user vehicle, from the vehicle environment information includes determining a motion pattern as lane splitting, when the lane position of the proximately located vehicle traveling continuously in a swerving motion between two adjacent instances of the proximately located vehicle that are traveling within the respective instances of the travel lane; and
   generate a navigation interface including a proximate vehicle representation of the proximately located vehicle and a user vehicle representation of the user vehicle on an interface map based on the relative location and the relative distance of the proximately located vehicle, wherein the proximate vehicle representation and the user vehicle representation are presented based on an interface scaled distance for displaying on a device, wherein the interface scaled distance is a distance scaled based on the dimensions of the navigation interface.

2. The system as claimed in claim 1 wherein:
   determine the proximate vehicle information including a vehicle speed, a vehicle heading, or a combination thereof for the proximately located vehicle; and
   generate the navigation interface including the vehicle speed, the vehicle heading, or the combination thereof.

3. The system as claimed in claim 1 wherein the control unit is configured to generate the navigation interface including the proximate vehicle representation according to a vehicle type of the proximately located vehicle.

4. The system as claimed in claim 1 wherein the control unit is configured to:
   receive map information including a travel lane;
   determine a traffic flow for the travel lane based on the proximate vehicle information for multiple instances of the proximately located vehicle; and
   generate the navigation interface including the traffic flow.

5. The system as claimed in claim 1 wherein the control unit is configured to:
   receive map information including a lane merge section; and
   generate the navigation interface including the proximate vehicle representation in the lane merge section based on the relative location of the proximately located vehicle.

6. The system as claimed in claim 1 wherein the control unit is configured to:
   determine the motion pattern of the proximately located vehicle as performing the lane splitting maneuver; and
   generate the navigation interface including the proximate vehicle representation performing the lane splitting maneuver.

7. The system as claimed in claim 1 wherein the control unit is configured to generate the interface map based on map information.

8. A method of operation of a navigation system comprising:
   receiving vehicle environment information of a user vehicle for identifying a proximately located vehicle relative to the user vehicle during operation of the user vehicle;
   determining proximate vehicle information of the proximately located vehicle, including a relative location and a relative distance from the user vehicle, from the vehicle environment information including determining a motion pattern as lane splitting, when the lane position of the proximately located vehicle traveling continuously in a swerving motion between two adjacent instances of the proximately located vehicle that are traveling within the respective instances of the travel lane; and generating a navigation interface including a proximate vehicle representation of the proximately located vehicle and a user vehicle representation of the user vehicle on an interface map based on the relative location and the relative distance of the proximately located vehicle, wherein the proximate vehicle representation and the user vehicle representation are presented based on an interface scaled distance for displaying on a device, wherein the interface scaled distance is a distance scaled based on the dimensions of the navigation interface.

9. The method as claimed in claim 8 further comprising:
determining the proximate vehicle information includes calculating a vehicle speed, a vehicle heading, or a combination thereof for the proximately located vehicle; and
generating the navigation interface includes displaying the vehicle speed, the vehicle heading, or the combination thereof.

10. The method as claimed in claim 8 further comprising:
receiving map information including a travel lane;
determining a traffic flow for the travel lane based on the proximate vehicle information for multiple instances of the proximately located vehicle; and
wherein:
generating the navigation interface includes presenting the traffic flow.

11. The method as claimed in claim 10 wherein generating the navigation interface includes generating the proximate vehicle representation according to a vehicle type of the proximately located vehicle.

12. The method as claimed in claim 8 further comprising:
receiving map information including a lane merge section; and
wherein:
generating the navigation interface includes the proximate vehicle representation in the lane merge section based on the relative location of the proximately located vehicle.

13. The method as claimed in claim 8 further comprising:
determining the motion pattern of the proximately located vehicle as performing the lane splitting maneuver; and
wherein:
generating the navigation interface including the proximate vehicle representation performing the lane splitting maneuver.

14. The method as claimed in claim 8 further comprising generating the interface map based on map information.

15. A non-transitory computer readable medium including instructions for a navigation system comprising:
receiving vehicle environment information of a user vehicle for identifying a proximately located vehicle relative to the user vehicle during operation of the user vehicle;
determining proximate vehicle information of the proximately located vehicle, including a relative location and a relative distance from the user vehicle, from the vehicle environment information including determining a motion pattern as lane splitting, when the lane position of the proximately located vehicle traveling continuously in a swerving motion between two adjacent instances of the proximately located vehicle that are traveling within the respective instances of the travel lane; and
generating a navigation interface including a proximate vehicle representation of the proximately located vehicle and a user vehicle representation of the user vehicle on an interface map based on the relative location and the relative distance of the proximately located vehicle, wherein the proximate vehicle representation and the user vehicle representation are presented based on an interface scaled distance for displaying on a device, wherein the interface scaled distance is a distance scaled based on the dimensions of the navigation interface.

16. The non-transitory computer readable medium as claimed in claim 15, wherein the instructions include:
determining the proximate vehicle information includes calculating a vehicle speed, a vehicle heading, or a combination thereof for the proximately located vehicle; and
generating the navigation interface includes displaying the vehicle speed, the vehicle heading, or the combination thereof.

17. The non-transitory computer readable medium as claimed in claim 15, wherein the instructions include generating the navigation interface includes generating the proximate vehicle representation according to a vehicle type of the proximately located vehicle.

18. The non-transitory computer readable medium as claimed in claim 15, wherein the instructions include:
determining a traffic flow for the travel lane based on the proximate vehicle information for multiple instances of the proximately located vehicle; and
wherein:
generating the navigation interface includes presenting the traffic flow.

19. The non-transitory computer readable medium as claimed in claim 15, wherein the instructions include:
receiving map information including a lane merge section; and
wherein:
generating the navigation interface includes the proximate vehicle representation in the lane merge section based on the relative location of the proximately located vehicle.

20. The non-transitory computer readable medium as claimed in claim 15, wherein the instructions include:
determining the motion pattern of the proximately located vehicle as performing the lane splitting maneuver; and
wherein:
generating the navigation interface including the proximate vehicle representation performing the lane splitting maneuver.

* * * * *